(12) United States Patent
Iandoli Espinosa (10) Patent No.: US 9,150,733 B2
(45) Date of Patent: Oct. 6, 2015

(54) ANTICORROSION COATING COMPOSITION IN AQUEOUS DISPERSION COMPRISING AN ORGANIC TITANATE AND/OR ZIRCONATE

(71) Applicant: NOF Metal Coatings Europe, Creil (FR)

(72) Inventor: Antonio Francisco Iandoli Espinosa, Sao Paulo (BR)

(73) Assignee: NOF METAL COATINGS EUROPE (FR)

( * ) Notice: Subject to any disclaimer, the term of this patent is extended or adjusted under 35 U.S.C. 154(b) by 0 days.

(21) Appl. No.: 14/088,911

(22) Filed: Nov. 25, 2013

(65) Prior Publication Data

US 2014/0106155 A1    Apr. 17, 2014

Related U.S. Application Data (60) Division of application No. 12/980,749, filed on Dec. 29, 2010, now Pat. No. 8,628,827, which is a continuation-in-part of application No. 10/589,040, filed as application No. PCT/IB2005/000488 on Feb. 10, 2005, now abandoned.

(30) Foreign Application Priority Data

Feb. 11, 2004    (FR) ..................... 04 01349

(51) Int. Cl.
| | | |
|---|---|---|
| B32B 9/00 | (2006.01) | |
| C09D 5/10 | (2006.01) | |
| C09D 4/00 | (2006.01) | |
| C09D 5/08 | (2006.01) | |
| C09D 183/14 | (2006.01) | |
| C23C 22/83 | (2006.01) | |
| C08G 77/58 | (2006.01) | |

(52) U.S. Cl.
CPC ...... C09D 5/106 (2013.01); C09D 4/00 (2013.01); C09D 5/086 (2013.01); C09D 5/10 (2013.01); C09D 183/14 (2013.01); C23C 22/83 (2013.01); C08G 77/58 (2013.01); *C23C 2222/20* (2013.01); *Y10T 428/31663* (2015.04)

(58) Field of Classification Search
CPC .......... C09D 5/10; C09D 5/084; C09D 5/086; C09D 5/106; C09D 183/00; C09D 183/14; C23C 22/83; C23C 2222/20
See application file for complete search history.

(56) References Cited

U.S. PATENT DOCUMENTS

| 3,687,882 | A | 8/1972 | Bishop | |
|---|---|---|---|---|
| 3,817,905 | A * | 6/1974 | Lerner et al. | 524/780 |
| 4,741,778 | A | 5/1988 | Horie et al. | |
| 5,200,237 | A | 4/1993 | Sugama | |
| 5,316,855 | A | 5/1994 | Wang et al. | |
| 6,303,229 | B2 * | 10/2001 | Takahama et al. | 428/447 |
| 6,391,465 | B1 | 5/2002 | Zheng et al. | |
| 6,605,365 | B1 * | 8/2003 | Krienke et al. | 428/472 |
| 7,081,508 | B2 | 7/2006 | Matsuda et al. | |
| 7,138,184 | B2 * | 11/2006 | Clerici et al. | 428/447 |
| 7,723,452 | B2 | 5/2010 | Hooftman et al. | |
| 2006/0127681 | A1 | 6/2006 | Domes et al. | |
| 2007/0134503 | A1 | 6/2007 | Espinosa | |
| 2010/0151257 | A1 | 6/2010 | Suzuki et al. | |

FOREIGN PATENT DOCUMENTS

| DE | 10308237 | 9/2004 |
|---|---|---|
| EP | 1233043 | 8/2002 |
| JP | 5741766 | 3/1982 |
| JP | 55115472 | 3/1982 |
| JP | 3367953 | 1/2003 |
| WO | WO0185854 | 11/2001 |
| WO | WO02088262 | 11/2002 |
| WO | 2005078026 | 8/2005 |

OTHER PUBLICATIONS

"Corrosion tests in artificial atmospheres—Salt spray tests (ISO 9227:2006) English version of DIN EN ISO 9227:2006-10"; ICS 19.040; 87.040; Coatings and Coating Materials Standards Committee; 28 Pages.

* cited by examiner

*Primary Examiner* — Margaret Moore
(74) *Attorney, Agent, or Firm* — Mark E. Bandy; Rankin, Hill & Clark LLP (57) ABSTRACT

Anticorrosion coating compositions for metallic parts based on particulate metal in aqueous dispersion are described. The compositions include an organic titanate or zirconate compatible in aqueous phase or in organic phase, an optional silane-based binder, and water. Also described are methods of forming anticorrosion coatings for metallic parts obtained from the noted coating compositions as well as a metallic substrate provided with the anticorrosion coating. The anticorrosion coatings exhibit excellent corrosion resistance upon baking at temperatures greater than 180° C. and up to 350° C.

33 Claims, 1 Drawing Sheet ial, from 1% to 25% by weight of a silane-based binder, and water, wherein the sum of the organic titanate and/or zirconate agent and of the silane-based binder is from 5 to 25% by weight. The resulting coating exhibits resistance to corrosion from exposure to saline mist for at least 200 hours without formation of red rust.
ANTICORROSION COATING COMPOSITION IN AQUEOUS DISPERSION COMPRISING AN ORGANIC TITANATE AND/OR ZIRCONATE

CROSS REFERENCES TO RELATED APPLICATIONS

This is a divisional application of U.S. application Ser. No. 12/980,749 filed Dec. 29, 2010, now U.S. Pat. No. 8,628,827, which is a continuation-in-part (CIP) application of U.S. application Ser. No. 10/589,040 filed Aug. 10, 2006, now abandoned, which is a National Phase of PCT/IB2005/000488, filed Feb. 10, 2005, which claims priority upon France Patent Application 0401349 filed Feb. 11, 2004.

FIELD OF THE INVENTION

The present invention relates to anticorrosion coating compositions for metal parts. The compositions are based on particulate metal in aqueous dispersion comprising an organic titanate or zirconate compatible in aqueous phase or in organic phase, an optional a silane-based binder, and water. The compositions are heated at particular temperatures to form coatings that exhibit excellent resistance to corrosion.

BACKGROUND OF THE INVENTION

A wide array of anticorrosion coatings are known in the art. One group of such coatings contain organic titanates and/or organic zirconates. Although satisfactory in certain regards, many of these compositions are free from water and so precautions must be undertaken to avoid exposure or contamination with water. Chelation techniques are known in which the titanates and/or zirconates can be modified to thereby allow their incorporation in aqueous systems. However, a need remains for a strategy in which such agents can be incorporated into an aqueous composition which then enables their subsequent use in an anticorrosion composition.

SUMMARY OF THE INVENTION

The difficulties and drawbacks associated with previously known systems are addressed in the present methods for forming coated metallic substrates having anticorrosion coatings, the resulting anticorrosion coatings, and the compositions utilized for forming such coatings.

In one aspect, the present invention provides a method for forming a coated metallic substrate having an anticorrosion coating. The method comprises obtaining a coating composition including from 0.3% to 24% by weight of at least one agent selected from the group consisting of organic titanate, organic zirconate and mixtures thereof, from 10% to 40% by weight of a particulate metal or a mixture of particulate metals, from 1% to 25% by weight of a silane-based binder, and water, wherein the sum of the organic titanate and/or zirconate agent and of the silane-based binder is from 5 to 25% by weight. The method also comprises forming a coating layer of the coating composition on a metallic substrate. And, the method additionally comprises subjecting the coating layer to a baking operation at a temperature greater than 180° C. and up to 350° C. by supply of thermal energy to thereby form the anticorrosion coating.

In another aspect, the present invention provides an anticorrosion coating resulting from baking a particular coating composition at a temperature between greater than 180° C. and up to 350° C. The coating composition comprises a coating composition including from 0.3% to 24% by weight of at least one agent selected from the group consisting of organic titanate, organic zirconate and mixtures thereof, from 10% to 40% by weight of a particulate metal or a mixture of particulate metals, from 1% to 25% by weight of a silane-based binder, and water, wherein the sum of the organic titanate and/or zirconate agent and of the silane-based binder is from 5 to 25% by weight. The resulting coating exhibits resistance to corrosion from exposure to saline mist for at least 200 hours without formation of red rust.

In yet another aspect, the present invention provides a coating composition including from 0.3% to 24% by weight of at least one agent selected from the group consisting of organic titanate, organic zirconate and mixtures thereof, from 10% to 40% by weight of a particulate metal or a mixture of particulate metals, from 1% to 25% by weight of a silane-based binder, and water, wherein the sum of the organic titanate and/or zirconate agent and of the silane-based binder is from 5 to 25% by weight.

In still another aspect, the present invention provides an aqueous composition of $C_1$-$C_8$ tetraalkyl titanate and/or zirconate, adapted for use in a coating composition for a metallic substrate in aqueous dispersion. The composition comprises the following proportions (percentages by weight): water-soluble organic solvent in an amount from 0 to 20%; silane-based binder in an amount from 20 to 50%, the silane having at least one hydrolysable hydroxyl function; at least one agent selected from the group consisting of $C_1$-$C_8$ tetraalkyl titanate, $C_1$-$C_8$ tetraalkyl zirconate and mixtures thereof in an amount from 5 to 25%, compatible in organic phase; and water in an amount sufficient to produce 100%.

In another aspect, the present invention provides a method for pretreating a substrate prior to receiving an adhesive or coating. The method comprises providing a composition comprising in the following proportions (percentages by weight): water-soluble organic solvent in an amount from 0 to 20%, silane-based binder in an amount from 20 to 50% the silane having at least one hydrolysable hydroxyl function, at least one agent selected from the group consisting of $C_1$-$C_8$ tetraalkyl titanate, $C_1$-$C_8$ tetraalkyl zirconate and mixtures thereof in an amount from 5 to 25% compatible in organic phase, and water in an amount sufficient to produce 100%. The method also comprises applying a coating of the composition to the substrate, to thereby pretreat the substrate.

In another aspect, the present invention provides a method for sealing a substrate or coated substrate. The method comprises providing a substrate or coated substrate. The method also comprises providing a composition comprising in the following proportions (percentages by weight): water-soluble organic solvent in an amount from 0 to 20%, silane-based binder in an amount from 20 to 50% the silane having at least one hydrolysable hydroxyl function, at least one agent selected from the group consisting of $C_1$-$C_8$ tetraalkyl titanate, $C_1$-$C_8$ tetraalkyl zirconate and mixtures thereof in an amount from 5 to 25% compatible in organic phase, and water in an amount sufficient to produce 100%. The method additionally comprises applying a coating of the composition on the substrate, to thereby seal the substrate or coated substrate.

In still another aspect, the present invention provides a method for passivating a substrate of steel, zinc, aluminium, or steel having a zinc-based coating. The method comprises providing a substrate selected from the group consisting of steel, zinc, aluminium, and steel having a zinc-based coating. The method also comprises providing a composition comprising in the following proportions (percentages by weight): water-soluble organic solvent in an amount from 0 to 20%, silane-based binder in an amount from 20 to 50% the silane having at least one hydrolysable hydroxyl function, at least one agent selected from the group consisting of $C_1$-$C_8$ tetraalkyl titanate, $C_1$-$C_8$ tetraalkyl zirconate and mixtures thereof in an amount from 5 to 25% compatible in organic phase, and water in an amount sufficient to produce 100%. And, the method also comprises applying a coating of the composition on the substrate, thereby passivating the substrate.

In still another aspect, the invention provides a method for improving the adhesion of coatings or adhesives in aqueous phase. The method comprises forming a composition comprising in the following proportions (percentages by weight): water-soluble organic solvent in an amount from 0 to 20%, silane-based binder in an amount from 20 to 50% the silane having at least one hydrolysable hydroxyl function, at least one agent selected from the group consisting of $C_1$-$C_8$ tetraalkyl titanate, $C_1$-$C_8$ tetraalkyl zirconate and mixtures thereof in an amount from 5 to 25% compatible in organic phase, and water in an amount sufficient to produce 100%. The method also comprises adding the composition to a coating or adhesive to thereby improve the resulting adhesion of the coating or adhesive.

As will be realized, the invention is capable of other and different embodiments and its several details are capable of modifications in various respects, all without departing from the invention. Accordingly, the drawings and description are to be regarded as illustrative and not restrictive.

DETAILED DESCRIPTION OF THE PREFERRED EMBODIMENTS

Before describing the present invention and its various preferred embodiments, it is instructive to consider several terms used herein. The expressions "titanate(s) compatible in organic phase" and "zirconate(s) compatible in organic phase" are understood as meaning every organic titanate and zirconate not compatible with water. That is, these terms refer to such titanate(s) and/or zirconate(s) that are not soluble in an aqueous composition and which in addition are sensitive to moisture and to water and which are thus prone to undergo a hydrolysis reaction.

In addition, the expressions "titanate(s) compatible in aqueous phase" and "zirconate(s) compatible in aqueous phase" are understood as meaning every organic titanate and zirconate compatible with water. That is, these terms refer to such titanate(s) and/or zirconate(s) that are soluble, emulsifiable, or dispersible in an aqueous composition. These are generally organic titanates and organic zirconates which have been stabilized by chelation. They are likewise referred to as "chelated (organic) titanate(s)" and "chelated (organic) zirconate(s)".

The organic titanates, as well as the organic zirconates, compatible in organic phase can be used in anhydrous compositions as catalysts, reticulating agents, surface-treatment agents, adhesion promoters or anticorrosion agents. However, these organic titanates, as well as the organic zirconates, have the disadvantage of being very sensitive to water and to moisture inasmuch as they are hydrolysed very rapidly. For example, in the case of the hydrolysis of tetra-n-butyl titanate, the following reactions occur:
1) Conversion of the organic titanate to hydrated titanium oxide Ti(OH)$_4$:

$$Ti(OC_4H_9)_4 + 4H_2O \rightarrow Ti(OH)_4 + 4C_4H_9OH$$

2) Then, formation of titanium dioxide $TiO_2$:

$$Ti(OH)_4 \rightarrow TiO_2 + 2H_2O$$

In order to avoid the formation of titanium dioxide or of zirconium dioxide, the titanates and zirconates compatible in organic phase must thus be employed under rigorously anhydrous conditions. Consequently, the preparation of anhydrous compositions comprising a titanate or a zirconate compatible in organic phase is accompanied by very constraining handling precautions in order to avoid the hydrolysis of the organic titanate to titanium dioxide on contact with air, moisture or traces of water.

The moisture resistance of titanates or zirconates compatible in organic phase can be improved by substituting two alkoxy groups by chelating agents. These chelating agents contain functional groups containing oxygen or nitrogen atoms which happen to stabilize the organic titanate or zirconate. These organic titanates or zirconates in chelated form can likewise be soluble in water, preferably in the presence of a weak acid of the acetic acid type. For example, U.S. Pat. No. 4,495,156 describes titanates in aqueous chelated form (TYZOR® AA which is a titanate compatible in organic phase, TYZOR® LA and TYZOR® TE which are titanates compatible in aqueous phase) which provide for improved adhesion to a substrate by a composition comprising such titanates.

The hydrolysis rate of the organic titanates and zirconates depends on the size and the complexity of the alkyl group. Generally, as the size of the alkyl group increases, the hydrolysis rate decreases. This is the reason why the organic titanates and zirconates in chelated form are less sensitive to hydrolysis than tetraalkyl titanates or tetra-alkyl zirconates.

U.S. Pat. No. 4,224,213 describes coating compositions comprising a short chain alkyl silicate of formula $Si(OR)_4$, a short chain alkyl titanate or zirconate and zinc powder. This coating composition is reticulated by reaction of the silicate and the titanate with moisture from the air. The examples of this patent note that the addition of silicate allows the moisture resistance of organic titanates to be improved. This coating composition is an organic composition which does not contain any water. The silicate, contrary to the silane, does not allow the adhesion of a composition comprising the silicate to a substrate.

EP Patent 0 808 883 describes an aqueous coating composition based on particulate metal, free from chromium, intended to be applied to a substrate. This composition, once applied to the substrate, undergoes hardening in heat in order to provide the substrate with protection against corrosion. In order to increase the corrosion resistance of this coated substrate, the coated substrate can optionally be coated with a supplementary layer comprising, for example, a silica material.

Surprisingly, the present invention is based upon a discovery that organic titanates and/or organic zirconates can be incorporated into an aqueous composition regardless of whether the organic titanates and/or zirconates are in chelated or non-chelated form and compatible or not compatible in aqueous phase. The invention is also based upon a discovery that application to a metallic substrate of an aqueous coating composition based on particulate metal comprising organic titanates and/or organic zirconates provides improvement in the resistance to corrosion of the substrate. Due to the excellent anticorrosion properties, a substrate coated by such a composition does not need any supplementary layer of anticorrosion coating. In addition, a coating is obtained that exhibits sufficient flexibility and resistance to shocks, which is particularly advantageous for anticorrosion coatings for screws and other metal fasteners.

The present invention relates to an anticorrosion coating composition for metal parts based on particulate metal in aqueous dispersion. The coating composition preferably comprises from about 0.3% to about 24% by weight of an organic titanate and/or zirconate, from about 10% to about 40% of a particulate metal or a mixture of particulate metals, from about 1% to about 25% of a silane-based binder, and water in an amount sufficient for 100%; with the condition that the sum of the organic titanate and/or the organic zirconate and of the silane-based binder is between 5 and 25%. Generally, the compositions comprise water in an amount of from about 35% to about 85% by weight.

In the preferred embodiment compositions, the organic titanate/zirconate content and silane based-binder content are such that the organic titanate/zirconate content is between 0.3 to 24% by weight, the silane based-binder content is between 1 to 25% by weight, and the sum of organic titanate/zirconate content and the silane based-binder content is between 5 to 25% by weight. This means that although the minimal organic titanate/zirconate content is 0.3% by weight and the minimal silane based-binder content is 1% by weight, the composition must comprise sufficient amounts of one or the other such that the minimal (organic titanate/zirconate and silane based-binder) content is 5% by weight. Similarly, although the maximum organic titanate/zirconate content is 24% by weight and the maximum silane based-binder content is 25% by weight, the composition must not comprise high amounts of the two since the maximum (organic titanate/zirconate and silane based-binder) content is 25% by weight.

More preferably, the compositions comprise from about 0.5% to about 19% by weight, with respect to the total weight of the composition, of organic titanate and/or zirconate and from about 1% to about 20% by weight, with respect to the total weight of the composition, of silane-based binder, with a condition that the sum of organic titanate and/or zirconate and silane-based binder is between about 7% and about 20% by weight, with respect to the total weight of the composition.

The organic titanates can be selected from the group comprising the previously noted organic titanates compatible in organic phase and the organic titanates compatible in aqueous phase.

The titanates compatible in organic phase are preferably $C_1$-$C_8$ tetraalkyl titanates which can be represented by the following formula (I'):

in which R1, R2, R3 and R4 independently represent an optionally substituted $C_1$-$C_8$ alkyl radical. The $C_1$-$C_8$ tetraalkyl titanate is preferably selected from the group comprising tetraethyl titanate (TET, $Ti(OC_2H_5)_4$), tetra-n-butyl titanate ($T_nBT$, $Ti(OC_4H_9)_4$) octylene glycol titanate (OGT, $Ti(O_2C_8H_{17})_4$), and combinations thereof.

The organic titanates compatible in organic phase can likewise be organic titanates in chelated form not compatible with water. As examples of organic titanates in chelated form not compatible with water (compatible in organic phase), it is especially possible to cite those marketed by Dupont de Nemours under the name TYZOR® AA (titanium acetylacetonate) or TYZOR® DC (diisopropoxy bisethylacetoacetato titanate).

The titanates compatible in aqueous phase are preferably chelated titanates, which can be represented by the following general formula (II'):

in which R and R' independently of one another represent an optionally substituted $C_1$-$C_8$ alkyl radical, X and X' independently represent a functional group comprising an oxygen or nitrogen atom, and Y and Y' independently represent a hydrocarbon chain having 1 to 4 carbon atoms. X and X' preferably represent an amino or lactate radical.

The organic titanate in chelated form compatible in aqueous phase is preferably selected from the group comprising the triethanolamine titanates (TYZOR® TE and TEP marketed by Dupont de Nemours). As an example of organic titanates in chelated form compatible in aqueous phase, it is likewise possible to cite those marketed by Dupont de Nemours under the name TYZOR® TA (alkanolamine titanate in chelated form) and TYZOR® LA (chelate of titanate and lactic acid).

The organic zirconate can be selected from the group comprising the previously noted zirconates compatible in organic phase and the zirconates compatible in aqueous phase.

The organic zirconates compatible in organic phase are preferably $C_1$-$C_{10}$ tetraalkyl zirconates, which can be represented by the following formula (I):

in which R1, R2, R3 and R4 independently represent an optionally substituted $C_1$-$C_{10}$ alkyl radical. The $C_1$-$C_{10}$ tetraalkyl zirconate is preferably selected from the group comprising tetra-n-propyl zirconate and tetra-n-butyl zirconate.

The organic zirconates compatible in organic phase can likewise be organic zirconates in chelated form not compatible with water. As an example of an organic zirconate in chelated form not compatible with water (compatible in organic phase), it is especially possible to cite those marketed by Dupont de Nemours under the name TYZOR® ZEC (chelated diethyl citrate zirconate).

The organic zirconates compatible in aqueous phase are preferably chelated zirconates which can be represented by the following general formula (II):

in which R and R' independently of one another represent an optionally substituted $C_1$-$C_{10}$ alkyl radical, X and X' independently represent a functional group comprising an oxygen or nitrogen atom, and Y and Y' independently represent a hydrocarbon chain having 1 to 4 carbon atoms. X and X' preferably represent an amino radical.

The chelated organic zirconate can preferably be triethanolamine zirconate (TYZOR® TEAZ marketed by Dupont de Nemours). As an example of an organic zirconate in chelated form compatible in aqueous phase, it is likewise possible to cite that marketed by Dupont de Nemours under the name TYZOR® LAZ (chelate of zirconate and lactic acid).

The particulate metal of the coating composition can be selected from the group comprising metallic pigments such as aluminium, manganese, nickel, titanium, stainless steel, zinc, their alloys, as well as their mixtures. The particulate metal is preferably selected from zinc and aluminium, as well as their alloys and their mixtures or their alloys with manganese, magnesium, tin or Galfan. Galfan refers to an alloy commercially available under that designation. Galfan alloys are a eutectic alloy of 95% zinc, nearly 5% aluminum, and a trace of mischmetal (rare earth elements) as per ASTM B750. Galfan is available from a wide array of suppliers. The particulate metal present in the composition is preferably in powder form, different homogeneous or heterogeneous geometric structures, especially spherical, lamellar, lenticular forms or other specific forms. The particulate metal preferably has a particle size of less than 100 µm, and more preferably less than 40 µm.

When the particulate metal is an alloy or a mixture of zinc and aluminium, the aluminium can optionally be present in very small quantities, for example 1 to 5% by weight of the particulate metal, while at the same time nevertheless providing a coating of shiny appearance. In certain embodiments, the preferred coating composition includes zinc and aluminum flakes. These flakes can serve as sacrificial agents to further protect the substrate against corrosion. Typically, the aluminium represents at least 10% by weight of the particulate metal, thus the weight ratio of the aluminium to the zinc is of the order of 1:9. On the other hand, for reasons of economy, the aluminium does not represent more than approximately 50% by weight of the total zinc and aluminium, so that the weight ratio of the aluminium to the zinc can reach 1:1. The content of particulate metal of the coating composition will not exceed approximately 40% by weight of the total weight of the composition in order to maintain the best coating appearance and will typically represent at least 10% by weight in order to obtain a shiny coating appearance. In certain embodiments of the invention, the coating composition can contain relatively high concentrations of pigments, such as from about 10% to about 40% by weight based upon the weight of the liquid composition. Surprisingly, the adhesion of the coating to an underlying substrate is remarkably good. Furthermore, it is believed that the adhesion of the preferred embodiment coatings to substrates is increased by use of relatively high curing temperatures as explained herein.

The metal or the component containing the metal, can contain in minor quantity of one or more solvents, for example dipropylene glycol and/or white spirit, especially when the metal has been prepared in lamellar form. The particulate metals provided in combination with solvents are typically used in the form of pastes, which can be used directly with other ingredients of the composition. However, the particulate metals can likewise be used in a dry form in the coating composition.

The silane-based binder preferably comprises a silane including at least one hydrolysable function in hydroxyl function selected from a $C_1$-$C_4$, preferably $C_1$-$C_2$, alkoxy radical. The silane preferably includes three hydrolysable functions in hydroxyl function, preferably identical. The silane can additionally include an epoxy (oxirane) function, which favors the reticulation and adhesion to the substrate. The term "hydrolysable function in hydroxyl function" as used herein refers to any chemical function capable of reacting with water in order to be converted into a hydroxyl function, i.e. OH.

The silanes, in the compositions of the present invention, serve as binding agents. They likewise allow the coating bath to be stabilized against harmful autogenous reaction(s). It is believed that the silane binds and passivates the particulate metal, to thereby improve the stability of the bath of the coating composition. In addition, that silane binding agent improves the adhesion of the coating and its resistance to corrosion. The silane preferably represents from about 3 to about 20% by weight of the total weight of the composition. However, the silane based binder can be used in a concentration of from about 1 to 25%.

The silane is preferably easily dispersed in the aqueous medium and is, preferably, soluble in such a medium. The silane used is preferably a silane with an epoxy function selected from di- or trimethoxysilane with an epoxy function and di- or triethoxysilane with an epoxy function, as well as their mixtures, in particular like beta-(3,4-epoxycyclohexyl) ethyl-trimethoxysilane, 4-(trimethoxysilyl)butane-1,2-epoxide, gamma-glycidoxypropyltrimethoxysilane or gamma-glycidoxypropyltriethoxysilane.

If the organic titanate and/or zirconate used is an organic titanate and/or zirconate compatible in aqueous phase, the silane is preferably introduced in quantities such that the proportions by mass, in the final composition, of organic titanate and/or zirconate compatible in aqueous phase: silane are between 95:5 and 5:95.

The anticorrosion composition can be prepared by mixing an organic phase, especially comprising the silane and the particulate metal, with an aqueous phase, especially comprising water and the silane. The organic titanate and/or zirconate compatible in aqueous phase can be introduced either into the aqueous phase or into the organic phase.

When the organic titanate and/or zirconate compatible in aqueous phase is introduced into the organic phase, it is possible to substitute the silane, normally present in the organic phase, by this organic titanate and/or zirconate. The proportions by mass, expressed in dry parts, of organic titanate and/or zirconate and of silane are preferably between 1:19 and 2:1, more preferably between 1:16 and 1:8.

When the organic titanate and/or zirconate compatible in aqueous phase is introduced into the aqueous phase, it is preferably first co-hydrolysed with the silane, normally present in the aqueous phase. The mass proportions of organic titanate and/or zirconate and of silane during the co-hydrolysis are preferably between 0.12 and 0.36, expressed in dry parts. The optimal conditions for the co-hydrolysis are obtained for a ratio by mass of 0.24 titanate and/or zirconate for 1 silane, the ratios being expressed in dry parts.

In order to co-hydrolyse the organic titanate and/or zirconate and the silane, the organic titanate and/or zirconate is introduced into the silane, in an appropriate ratio, then they are co-hydrolysed by addition of 200 to 500% of water. It is believed that the duration of the co-hydrolysis reaction, that is to say the waiting time which follows the addition of the water, for example 30 or 90 min, does not have any influence on the properties of the co-hydrolysate obtained. If, instead of co-hydrolysing the silane and the organic titanate and/or zirconate compatible in aqueous phase, they are each hydrolysed separately, less satisfactory results are obtained in terms of product stability.

The addition of organic titanate and/or zirconate compatible in aqueous phase in the aqueous phase of the anticorrosion composition improves the anticorrosion properties of this composition more than if this titanate and/or zirconate had been added in the organic phase.

If the organic titanate and/or zirconate used is a titanate and/or zirconate compatible in organic phase, preferably a $C_1$-$C_8$ tetraalkyl titanate and/or zirconate, the silane is preferably introduced in quantities such that the proportions by mass, in the final composition, of titanate and/or zirconate compatible in organic phase/silane are between 60/40 and 5/95, and preferably between 50/50 and 10/90.

The liquid medium of the coating composition is virtually always water or a combination of water and organic solvent. Other solvents can optionally be used but, preferably, only in very small quantities. Typically, the compositions comprise 28 to 65% by weight of water, with respect to the total weight of the composition. In other embodiments, the compositions comprise water in an amount of from about 35% to about 85% by weight.

According to a preferred embodiment of the invention, the coating composition additionally comprises 1 to 30% by weight of organic solvent or of a mixture of organic solvents, with respect to the total weight of the composition. The organic solvents are preferably selected from the group comprising glycolic solvents such as glycol ethers, in particular diethylene glycol, triethylene glycol and dipropylene glycol, acetates, propylene glycol, polypropylene glycol, nitropropane, alcohols, ketones, propylene glycol methyl ether, 2,2,4-trimethyl-1,3-pentanediol isobutyrate (texanol), white spirit, as well as their mixtures.

Dipropylene glycol is particularly preferred, especially for reasons of economy and for protection of the environment. The quantity of solvents is preferably less than 25% by weight, even more preferably less than 16% by weight, with respect to the total weight of the composition. When the metallic particles have been prepared in lamellar form in a solvent, the particulate metal resulting can be in the form of a paste. The particulate metal can then form a part of the organic solvent of the composition according to the invention.

According to a preferred embodiment of the invention, the coating composition additionally comprises 0.1 to 7% by weight of molybdenum oxide, with respect to the total weight of the composition. The presence of molybdenum oxide $MoO_3$ in the anticorrosion coating composition allows control of the sacrificial protection exerted by the particulate metal in suspension in the composition to be improved. The molybdenum oxide $MoO_3$ is preferably used in an essentially pure orthorhombic crystalline form having a content of molybdenum of greater than approximately 60% by mass. Preferably, the molybdenum oxide $MoO_3$ will be used in the anticorrosion compositions in the form of particles of dimensions of between 5 and 200 μm.

According to a preferred embodiment of the invention, the coating composition additionally comprises 0.5 to 10% by weight of a reinforcing agent selected from the group comprising yttrium, zirconium, lanthanum, cerium, praseodymium, in the form of oxides or of salts. The reinforcing agent of the composition is preferably yttrium oxide $Y_2O_3$ or cerium chloride. The reinforcing agent of the composition can preferably be combined with the abovementioned molybdenum oxide, in a mass ratio as follows: 0.25<reinforcing agent:$MoO_3$<20; preferably 0.5<reinforcing agent:$MoO_3$<16; and most preferably 0.5<reinforcing agent:$MoO_3$<14.

According to a preferred embodiment, the coating composition additionally comprises a corrosion inhibitor pigment or corrosion inhibitor pigments such as the tri- or polyphosphate of aluminium, phosphates, molybdates, silicates and borates of zinc, strontium, calcium, barium and their mixtures, at levels on the order of about 0.2 to 4% by weight, with respect to the total weight of the coating composition.

The coating composition according to the invention can additionally comprise a thickening agent. The thickening agent is preferably selected from the group comprising cellulosic derivatives such as hydroxymethylcellulose, hydroxyethylcellulose, hydroxy-propylcellulose, cellulose acetobutyrate, xanthan gum, associative thickeners of polyurethane or acrylic type, silicates such as optionally treated silicates of magnesium and/or of lithium or organophilic clays as well as their mixtures. The content of thickening agent is typically less than 7% by weight with respect to the total weight of the composition, and preferably between 0.005 and 7% by weight with respect to the total weight of the composition.

The coating composition according to the invention can likewise comprise a wetting agent, in a content preferably less than 4% by weight, and more preferably between 0.1 and 4% by weight, with respect to the total weight of the composition.

The composition according to the invention can also comprise a pH stabilizer such as boric acid, metaboric acid, tetraboric acid and boron oxide or boron salts. The composition can comprise, with respect to the total weight of the composition, 0.1 to 10% by weight, preferably 0.2 to 5% by weight and most preferably 0.4 to 0.8% by weight, of pH stabilizer.

The composition can likewise comprise a pH modifier, generally selected from oxides and hydroxides of alkali metals, preferably lithium and sodium, the oxides and the hydroxides of metals belonging to groups IIA and IIB of the Periodic Table, such as the compounds of strontium, calcium, barium, magnesium and zinc. The pH modifier can likewise be a carbonate or a nitrate of the abovementioned metals.

The composition according to the invention can likewise comprise phosphates, substituents containing phosphorus, such as ferrophosphate (pigment), non-organic salts, in quantities less than 2% by weight with respect to the weight of the composition.

The composition according to the invention is preferably free from chromium VI. The composition can, however, contain chromium in soluble or non-soluble form such as, for example, metallic chromium or chromium of oxidation state III.

The composition has good stability on storage, confirming the protective role of the silane towards a harmful reaction of the particulate metal with other ingredients of the composition. The silane likewise allows organic titanate to be stabilized.

The present invention likewise relates to the coating obtained by application of the coating composition according to the invention to a substrate, preferably by spraying, soaking-draining or soaking-centrifugation. The term "soaking-draining" refers to a technique in which a substrate or item to receive a layer or coating of the liquid composition is immersed in a bath or other vessel containing the composition, at least partially removed from the bath, and excess liquid composition on the substrate or item allowed to drain or drip from the substrate and return to the bath. The term "soaking-centrifugation" refers to a technique in which a substrate or item to receive a layer or coating of the liquid composition is immersed in a bath or other vessel containing the composition, at least partially removed from the bath, and then subjected to one or more centrifugation operations to remove excess liquid from the substrate or item. The present invention includes other techniques for applying the liquid coating composition and/or removing excess composition therefrom and in no way is limited to these particular techniques or operations.

The coating layer is then subjected to a baking or curing operation, preferably at a temperature of between 180° C. and 350° C., more preferably greater than 180° C. to 350° C., more preferably between 240° C. and 350° C., and most preferably between 240° C. and 330° C., for approximately 10 to 60 minutes, by supply of thermal energy, such as by convection or infrared, or for approximately 30 seconds to 5 minutes by induction for example. It will be appreciated that the present invention includes a wide range of techniques for baking and/or curing the composition. As further explained herein, it is preferred to bake or cure a coating of the preferred embodiment composition at the noted temperatures in order to obtain the excellent and surprising anticorrosion properties of the coating. Baking or curing at such temperatures is believed to result in the formation of a structure in the resulting coating which is particularly resistant to corrosion.

According to a preferred embodiment, the anticorrosion coating results from an application operation involving, prior to a baking operation, a drying operation of the coated metallic parts, by supply of thermal energy, such as by convection, infrared or induction, at a temperature of between 30° C. and 250° C., preferably at a temperature of 70° C., in convection or in infrared heating for 10 to 30 minutes on line or for approximately 30 seconds to 5 minutes by induction heating. Before coating, it is judicious in the majority of cases to eliminate any foreign matter from the surface of the substrate, especially by cleaning and careful degreasing. Under these conditions, the thickness of the dry coating film thus applied is between 3 μm (11 g/m$^2$) and 30 μm (110 g/m$^2$) and preferably between 4 μm (15 g/m$^2$) and 12 μm (45 g/m$^2$), more particularly between 5 μm (18 g/m$^2$) and 10 μm (40 g/m$^2$).

The present invention also extends to the metallic substrate, preferably of steel or steel coated with zinc or with a base layer of zinc deposited by different application methods including mechanical deposition, to cast iron and aluminium, provided with an anticorrosion coating according to the invention applied with the aid of the previously noted compositions.

The metallic substrate can be previously treated, for example by a treatment with chromate or with phosphate. Thus, the substrate can be pretreated in order to have, for example, a phosphate coating of iron in a quantity of 0.1 to 1 g/m$^2$ or a phosphate coating of zinc in a quantity of 1.5 to 4 g/m$^2$.

The present invention likewise relates to an aqueous composition of $C_1$-$C_8$ tetraalkyl titanate and/or of $C_1$-$C_8$ tetraalkyl zirconate, intended for the preparation of a coating composition for a metallic substrate in aqueous dispersion, prepared from a water-soluble organic solvent, a binder containing a silane including at least one hydrolysable function in hydroxyl function, a $C_1$-$C_8$ tetraalkyl titanate and/or zirconate and water, in the following proportions (percentages by mass): from about 0% to about 20% water-soluble organic solvent; from about 20% to about 50% of silane-based binder; from about 5% to about 25% $C_1$-$C_8$ tetraalkyl titanate and/or zirconate; and from about 40% to about 70% water.

In the context of the present invention, that is to say when the silane is found in the presence of $C_1$-$C_8$ tetraalkyl titanate and/or zirconate, it is believed that the silane, in hydrolysed form before condensation, is capable of reacting with the previously noted hydrated titanium oxide and/or zirconate in order to provide a partially stable polymeric chain containing silicon and titanium and/or zirconate atoms. The silane is believed to then stabilize the $C_1$-$C_8$ tetraalkyl titanate and/or zirconate. The chemical reactions can be expressed as follows:

(1) Hydrolysis of the silane:

R—Si(OR')$_3$+3H$_2$O ↔ R—Si(OH)$_3$+3R'OH (2) Conversion of the organic titanate or zirconate to hydrated titanium or zirconium oxide:

X—(OR")$_4$+4H$_2$O ↔ X(OH)$_4$+4R"OH (3) Reaction between the hydrated titanium or zirconium oxide and the hydrolysed silane:

2R—Si(OH)$_3$+X(OH)$_4$ ↔ X(OH)$_2$.2[R—SiO(OH)$_2$]

The silane and the organic titanate or zirconate thus associate in order to form the following partial polymeric chain:

X(OH)$_2$.2[R—SiO(OH)$_2$]

The reaction can continue and lead to the formation of a polymeric chain of the following formula (III):

formula (III)

in which X represents Ti or Zr.

The water-soluble organic solvent is preferably selected from the group comprising glycolic solvents such as the glycol ethers, in particular diethylene glycol, triethylene glycol and dipropylene glycol, acetates, propylene glycol, alcohols, ketones, propylene glycol ether, as well as their mixtures.

The silane including at least one hydrolysable function in hydroxyl function contained in the binder is preferably selected from a $C_1$-$C_4$, and most preferably $C_1$-$C_2$, alkoxy radical. In addition, this silane preferably includes an epoxy function. The noted silane is preferably chosen from di- or trimethoxysilane with an epoxy function and di- or triethoxysilane with an epoxy function, as well as their mixtures, in particular gamma-glycidoxypropyl-trimethoxysilane or beta-(3,4-epoxycyclohexyl)ethyl-trimethoxysilane.

The $C_1$-$C_8$ tetraalkyl titanate is preferably selected from the group comprising tetra-ethyl titanate (TET), tetra-n-butyl titanate (T$_n$BT) and octyleneglycol titanate (OGT) and the $C_1$-$C_8$ tetraalkyl zirconate is selected from the group comprising tetra-n-propyl zirconate and tetra-n-butyl zirconate. In the aqueous composition, the ratio by mass of $C_1$-$C_8$ tetraalkyl titanate and/or zirconate with respect to the silane is from about 60/40 to about 40/60, and preferably about 50/50.

The aqueous composition of $C_1$-$C_8$ tetraalkyl titanate and/or $C_1$-$C_8$ tetraalkyl zirconate can be prepared by mixing the silane-based binder, the noted titanate or zirconate and, if necessary, the water-soluble organic solvent, with a small quantity of water and then, by continuous progressive addition, at a low rate, of the remaining quantity of water.

In this stabilized form, the $C_1$-$C_8$ tetraalkyl titanate and/or zirconate can, for example, then be introduced into a coating composition for a metallic substrate in aqueous phase, especially an anticorrosion coating composition based on particulate metal in aqueous dispersion, while limiting the formation of titanium dioxide.

The present invention also relates to the use of the aqueous composition of $C_1$-$C_8$ tetraalkyl titanate and/or $C_1$-$C_8$ tetraalkyl zirconate defined above in pretreatment for coatings or adhesives such as for example various polyurethanes, acrylics, rubbers . . . . This composition can also be used in post treatment applications as a sealer based on metallic particles. This composition can likewise be used in passivation treatments for substrates based on steel, zinc, aluminium or steel covered with a zinc-based coating. This composition can also be used in an additive in order to improve the adhesion of the coatings or adhesives (polyurethane, acrylic, rubber, . . . ) in aqueous phase.

EXAMPLES

The examples described herein illustrate various manners in which the present invention can be employed, and do not limit the present invention in any fashion.

Preparation of Test Panels:

Unless indicated otherwise, the test panels are typically stainless steel panels with a low carbon content, laminated in the cold. They are prepared by immersion in a cleaning solution. Then, the panels are wiped with a cleaning pad and then rinsed with water and again immersed in the cleaning solution. After removal of the solution, the panels are rinsed with tap water and dried.

Application of the Coating to the Test Panels and Weight of the Coating:

The clean parts are coated, in a typical fashion, by dipping the parts into the coating composition, by withdrawing the parts, and then draining the excess composition. This process is repeated several times with a moderate stirring action. The coated parts are then immediately baked or dried at ambient temperature or pre-hardened at a moderate temperature until the coating is dry to the touch and thus baked. The coating weights (mg/cm$^2$) are determined by comparative weighing before and after coating.

Test of Resistance to Corrosion (ISO 9227) and Estimation:

The resistance to corrosion of coated parts is measured by means of a standard salt projection test (saline mist) for paints and varnishes, referred to as ISO 9227. In this test, the parts are placed in a chamber maintained at a constant temperature where they are exposed to a fine projection (mist) of a 5% saline solution during specific periods of time, rinsed with water and dried. The extent of corrosion of the parts tested can be expressed in the form of the percentage of red rust.

Example 1

Composition Based on Organic Titanate Compatible in Organic Phase

In this example, a preferred embodiment composition set forth in Table 1 was prepared as described herein.

TABLE 1

Preferred Embodiment Composition

| Constituent | Quantity (g/kg) |
| --- | --- |
| DPG (dipropylene glycol) | 170.60 |
| R40[5] | 13.00 |
| R95[6] | 14.00 |
| Dry aluminium[2] | 25.00 |

TABLE 1-continued

Preferred Embodiment Composition

| Constituent | Quantity (g/kg) |
| --- | --- |
| Zinc paste[1] | 245.00 |
| Silane A-187[3] | 90.00 |
| Dehydran[10] | 5.00 |
| Sodium silicate[4] | 8.00 |
| Boric acid | 7.50 |
| Molybdenum oxide[9] | 8.00 |
| $T_n$BT (tetra-n-butyl titanate)[8] | 40.00 |
| Kelzan[7] | 0.65 |
| Water | 373.30 |

[1]Zinc in the form of paste to approximately 92% in white spirit
[2]Alu Chromal VIM powder marketed by Eckart Werke
[3]γ-glycidoxypropyltrimethoxysilane (Crompton)
[4]sodium silicate (Rhodia)
[5, 6]Ethoxylated nonylphenol of R40 or of R95, supplier Oxiteno SA (Brazil)
[7]Kelzan/Rhodopol 23 from Rhodia
[8]Supplier DuPont de Nemours
[9]Supplier Lavollée
[10]Supplier Cognis SA

Example 2

Composition Based on Organic Titanate Compatible in Organic Phase

In this example, another preferred embodiment composition set forth in Table 2 was prepared.

TABLE 2

Preferred Embodiment Composition

| Constituent | Quantity (g/kg) |
| --- | --- |
| DPG (dipropylene glycol) | 175.60 |
| R40 | 13.00 |
| R95 | 14.00 |
| Dry aluminium | 10.00 |
| Zinc paste | 260.00 |
| Silane A-187 | 115.00 |
| Silicate H300 | 10.00 |
| Boric acid | 9.50 |
| Molybdenum oxide | 10.00 |
| $T_n$BT (tetra-n-butyl titanate) | 60.00 |
| Kelzan | 0.65 |
| Water | 317.25 |

The composition set forth in Table 2 was coated on various metal parts and then the coated parts heat cured as described herein. The results of resistance to saline mist are set forth below in Table 3.

TABLE 3

Results of Tests of Resistance to Saline Mist

| Duration of bath (days) | Layer coating weight (g/m$^2$) | Resistance to saline mist (hours) |
| --- | --- | --- |
| 5 | 23.6 | 2064 |
| 10 | 19.8 | 1944 |
| 15 | 20.1 | 1752 |

Example 3

Composition Based on Organic Titanate Compatible in Organic Phase

Another preferred embodiment composition was formed as follows.

TABLE 4

Preferred Embodiment Composition

| Constituent | Quantity (g/kg) |
|---|---|
| DPG (dipropylene glycol) | 153.50 |
| R40 | 13.00 |
| R95 | 14.00 |
| Dry aluminium | 10.00 |
| Zinc paste | 260.00 |
| Silane A-187 | 95.00 |
| Silicate H300 | 10.00 |
| Boric acid | 9.50 |
| Molybdenum oxide | 10.00 |
| TET (tetraethylene titanate)[11] | 40.00 |
| Kelzan | 0.65 |
| Water | 379.35 |

[11] supplied by DuPont de Nemours

The composition set forth in Table 4 was coated on various metal parts and then the coated parts heat cured as described herein. The results of resistance to saline mist are set forth below in Table 5.

TABLE 5

Results of Tests of Resistance to Saline Mist

| Duration of bath (days) | Layer coating weight (g/m²) | Resistance to saline mist (hours) |
|---|---|---|
| 5 | 20.8 | 456 |
| 10 | 19.7 | 360 |

Example 4

Process for Preparation of an Aqueous Composition of Tetrabutyl Titanate, Organic Titanate Compatible in Organic Phase The following reagents are mixed in order:
a) 30.00 g of DPG (dipropylene glycol)
b) 50.00 g of silane A-187
c) 20.00 g of $T_nBT$ (tetrabutyl titanate)

The solution obtained is allowed to stand for 24 hours. The silane, introduced into the DPG before the $T_nBT$, reacts with the water optionally present in the DPG. An uncontrolled reaction of the organic titanate with the water optionally present in the DPG is thus avoided. 100.00 g of water (approximately 100.00 ml) are added respecting the following procedure:

i) add 0.125 ml of water dropwise and then allow the solution to stand for 10 minutes;
 ii) repeat step i) 5 times;
 iii) add the remaining quantity of water at a rate of 0.25 ml of water/minute/3 pulses, or approximately 0.083 ml of water every 20 seconds.

An aqueous composition of colorless organic titanate is obtained. Small crystals can appear. It is believed that these are silica crystals.

The total duration of the preparation of the aqueous composition of organic titanate is approximately 7 h 30 min.

The aqueous composition of organic titanate is allowed to stand for at least 24 hours before optionally being introduced into a composition of anticorrosion coating.

Example 5

Process for Preparation of an Aqueous Composition of Organic Titanate Compatible in Organic Phase The process proceeds in the same fashion as in Example 4 except that the quantity of $T_nBT$ introduced is 30.00 g. An aqueous composition of colorless or sometimes slightly yellow organic titanate is obtained.

Example 6

Process for Preparation of an Aqueous Composition of Organic Titanate Compatible in Organic Phase The process proceeds in the same fashion as in Example 4 except that the quantity of $T_nBT$ introduced is 40.00 g. An aqueous composition of colorless or sometimes slightly yellow organic titanate is obtained.

Example 7

Process for Preparation of an Aqueous Composition of Organic Titanate Compatible in Organic Phase The process proceeds in the same fashion as in Example 4 except that the quantity of $T_nBT$ introduced is 40.00 g and the quantity of silane A 187 introduced is 70.00 g. An aqueous composition of colorless or sometimes slightly yellow organic titanate is obtained.

Example 8

Corrosion Resistance of a Coating Composition Based on Organic Titanate Compatible in Organic Phase The aqueous composition of organic titanate obtained in Example 6 is introduced into an anticorrosion coating composition. Table 6 below indicates the formulation of the composition thus obtained and that of an anticorrosion coating composition of the prior art which does not contain organic titanate.

TABLE 6

Preferred Embodiment Composition and Prior Art Composition

| | Preferred Embodiment Composition A (g/kg) | Composition of the Prior Art B (g/kg) |
|---|---|---|
| DPG | 160.60 | 160.60 |
| Silane A 187 | 90.00 | 90.00 |
| Water | 383.30 | 421.10 |
| Tetra-n-butyl titanate | 40.00 | — |
| Dry aluminium lamellae | 25.00 | 25.00 |
| Zinc paste | 245.00 | 245.00 |
| Molybdenum oxide | 8.00 | 10.00 |
| R40 | 13.00 | 13.00 |
| R95 | 14.00 | 14.00 |
| Dehydran | 5.00 | 5.00 |
| Sodium silicate | 8.00 | 8.00 |
| Boric acid | 7.50 | 7.50 |
| Kelzan | 0.60 | 0.80 |

The characteristics of composition A are reported in Table 7 below:

TABLE 7

Characteristics of Preferred Embodiment Composition A

| Duration of the bath | Adhesion | Appearance | pH | Coating weight (g/m²) | % of solid | Viscosity |
|---|---|---|---|---|---|---|
| 72 hours | excellent | very good | 7.7 | 1.35 | 36.1 | 54 s (23° C.) |
| 5 days | excellent | very good | 7.9 | 1.36 | 37.0 | 64 s (23° C.) |
| 10 days | excellent | very good | 8.1 | 1.39 | 38.3 | 70 s (26° C.) |
| 15 days | excellent | very good | 7.9 | 1.40 | 40.0 | 83 s (26° C.) |
| 20 days | excellent | very good | 7.8 | 1.42 | 41.9 | 121 s (25° C.) |
| 25 days | excellent | very good | 8.1 | 1.39 | 39.4 | 90 s (24° C.) |

The resistance of the two compositions to the saline mist is compared. The resistance values to the saline mist measured are summarized in Table 8 below.

TABLE 8

Results of Tests of Resistance to Saline Mist

| Preferred Embodiment Composition A | | Composition of the Prior Art B | |
|---|---|---|---|
| Layer coating weight (g/m²) | Resistance to saline mist (hours) | Layer coating weight (g/m²) | Resistance to saline mist (hours) |
| 16 | 704 | 16 | 208 |
| 20 | 880 | 20 | 260 |
| 24 | 1056 | 24 | 312 |
| 28 | 1232 | 28 | 364 |
| 32 | 1408 | 32 | 416 |
| 36 | 1584 | 36 | 468 |

Satisfactory results for resistance to the saline mist are thus observed for the coating composition according to the invention. In fact, for a layer coating weight of 24 g/m², it is possible to attain a duration of resistance to the saline mist of greater than 1000 hours whereas for a composition without organic titanate the duration of resistance to the saline mist is only 312 hours. The addition of organic titanate allows the corrosion resistance of the coating to be at least tripled under these conditions.

Example 9

Composition Based on Organic Titanate Compatible on Organic Phase

The addition of small quantities of organic titanate (for example 10, 20 or 30 g/kg) allows the quantity of silane and of molybdenum oxide to be introduced to be decreased, which reduces costs, while conserving good anticorrosion results.

In the following examples of additional preferred embodiment compositions (Table 9), the quantity of silane is reduced to 44% by weight and the quantity of molybdenum oxide is reduced to 20% by weight, with respect to the quantities conventionally introduced into anticorrosion coating compositions.

TABLE 9

Preferred Embodiment Compositions

| | Composition C (g/kg) | Composition D (g/kg) | Composition E (g/kg) |
|---|---|---|---|
| DPG | 160.60 | 160.60 | 160.60 |
| Silane A 187 | 50.00 | 50.00 | 50.00 |
| Water | 453.20 | 443.20 | 433.20 |
| Tetra-n-butyl titanate | 10.00 | 20.00 | 30.00 |
| Dry aluminium lamellae | 25.00 | 25.00 | 25.00 |
| Zinc paste | 245.00 | 245.00 | 245.00 |
| Molybdenum oxide | 8.00 | 8.00 | 8.00 |
| R40 | 13.00 | 13.00 | 13.00 |
| R95 | 14.00 | 14.00 | 14.00 |
| Dehydran | 5.00 | 5.00 | 5.00 |
| Sodium silicate | 8.00 | 8.00 | 8.00 |
| Boric acid | 7.50 | 7.50 | 7.50 |
| Kelzan | 0.70 | 0.70 | 0.70 |

The values of resistance to the saline mist measured are summarized in Table 10 below.

TABLE 10

Results of Tests of Resistance to Saline Mist

| | Composition C | Composition D | Composition E |
|---|---|---|---|
| Weight of layer (g/m²) | 21 | 22.5 | 20.5 |
| Red rust (number of hours) | 170 | 310 | 430 |

Example 10

Process of Introduction of Chelated Organic Titanates or Zirconates, Compatible in Aqueous Phase, into an Aqueous Phase, Co-Hydrolysis with the Silane A preferred embodiment composition comprising a titanate is prepared as follows. An aqueous phase is prepared by combining 10 parts by weight of TYZOR® TEP (supplied by DuPont de Nemours, 60% dry extract) and 25 parts by weight of silane A-187, and mixing with magnetic stirring for one hour. 113 parts by weight of water are then added rapidly and the magnetic stirring is maintained for one hour.

This mixture is then introduced into an aqueous composition of 350 parts by weight of water, 8.8 parts by weight of sodium silicate, 8.2 parts by weight of boric acid and 9 parts by weight of molybdenum oxide.

An organic phase is prepared by combining the components set forth in Table 11 as follows.

TABLE 11

| Organic Phase | |
|---|---|
| Constituent | Parts by Weight |
| Dipropylene glycol | 75 |
| Remcopal N4100[12] | 14 |
| Remcopal N9 1001[13] | 15.5 |
| Silane A 187 | 70 |
| Zinc paste | 235 |
| Aluminium Stapa[14] | 30 |

TABLE 11-continued

Organic Phase

| Constituent | Parts by Weight |
|---|---|
| Schwego foam 8325[15] | 5.5 |
| Yttrium oxide[16] | 30 |
| Aerosil 380[17] | 0.4 |

[12]wetting agent of ethoxylated nonylphenol type (CECA)
[13]wetting agent of ethoxylated nonylphenol type (CECA)
[14]80% Chromal VIII in dipropylene glycol, marketed by Eckart Werke
[15]hydrocarbon-type antifoam (Schwegman)
[16]$Y_2O_3$ of purity equal to 99.99%
[17]anti-sedimentation agent of silica type (Degussa)

A preferred embodiment bath in accordance with the present invention was prepared by mixing the previously noted aqueous phase and organic phase.

A reference bath was prepared by combining an aqueous phase as set forth in Table 12 with an organic phase.

TABLE 12

Aqueous Phase of Reference Composition

| Constituent | Parts by Weight |
|---|---|
| Water | 463 |
| Sodium silicate 20 N 32 | 8.8 |
| Boric acid | 8.2 |
| Molybdenum oxide | 9 |
| Silane A 187 | 31 |

The organic phase of the reference composition has the same composition as the organic phase of the previously noted preferred embodiment bath according to the invention (Table 11).

The saline mist tests are carried out after an ageing of the baths, according to the invention and reference, for 48 hours. The results obtained are given in Table 13 below:

TABLE 13

Results of Tests of Resistance to Saline Mist

| | Results on screws ($5^d$/$4.8^e$) | | | Results on steel support | |
|---|---|---|---|---|---|
| | Such as | V + CM[a] | 2 × G[b] | Sacrificial protection[c] | 2 × G[b] |
| Reference Bath | 672/672 | 456/840 | 168/336 | 624 | 168 |
| Preferred Embodiment Bath | >1150 | 840/912 | 336/576 | 1150 | 744 |

[a]V + CM: saline mist results after the screws had been subjected to the mechanical shocks of vibrations and falls.
[b]2 × G: saline mist results after the screws or the plates had been subjected twice to chipping, that is to say a spattering of impacts.
[c]Sacrificial protection: number of hours of exposure to the saline mist, without red rust after incision of the coating to the metal.
[d]notation 5: results corresponding to less than 1% of red rust on surface.
[e]notation 4.8: results corresponding to less than 5% of red rust on surface.

Table 13 demonstrates that the introduction of chelated organic titanate, compatible in aqueous phase, co-hydrolysed with the silane in the coating compositions increases the resistance to saline mist of the samples treated by these compositions.

Example 11

The following evaluations were performed using a preferred embodiment coating composition with an organic titanate compatible in organic phase, tetra-ethyl titanate. The coating composition is applied on screws (two layers). The coated screws are then submitted to a heating or curing step, namely:

Phase 1: 150° C. for 25 min
Phase 2: 180° C. for 25 min
Phase 3: 250° C. for 25 min
Phase 4: 330° C. for 15 min After this heating step, the coated screws are exposed to saline mist or to atmospheric conditions. Upon observation, each sample was assigned a grade according to the following schedule set forth below in Table 14.

TABLE 14

Schedule of Rust Grades

| Grade "5" | 0% red rust |
|---|---|
| Grade "4" | 1 to 5% red rust |
| Grade "3" | 5 to 15% red rust |
| Grade "2" | 15 to 25% red rust |
| Grade "1" | 25 to 50% red rust |
| Grade "0" | >50% red rust |

The grade for each test item (evaluated after each heating temperature) is the mean value for 5 screws.

TABLE 15

Results of Tests of Resistance to Saline Mist

| Heating temperature | Layer coating weight (g/m²) | Cohesion 0-3 (max) | Saline mist (hours) | |
|---|---|---|---|---|
| 150° C. | 27.1 | 3 | 72 h - grade 1 | |
| 180° C. | 26.5 | 3 | 72 h - grade 2 | |
| 250° C. | 24.3 | 3 | 72 h - grade 5 | 144 h - grade 4.4 |
| 330° C. | 22.7 | 3 | 1032 h - grade 5 | 1152 h - grade 4.8 |

TABLE 16

Results of Tests of Resistance to Atmospheric Conditions

| Heating temperature | Saline mist (days) | |
|---|---|---|
| 150° C. | 15 d - grade 4 | |
| 180° C. | 15 d - grade 5 | 20 d - grade 4.2 |
| 250° C. | 118 d - grade 5 | 126 d - grade 4.8 |
| 330° C. | 146 d - grade 5 | |

These results demonstrate that the coating composition must be heated to and preferably maintained at a sufficient temperature to provide an effective anticorrosion action. The starting temperature, at which one starts to observe a slight effect on anticorrosion, is 180° C. When the coating composition is heated at higher temperatures, of 250° C. or 330° C., the anticorrosion properties are significantly improved. Preferably, the coating composition is maintained or held at such relatively high temperatures for a period of from about 1 minute to several hours or more, and more preferably from about 10 minutes to about 60 minutes when using convective heating or infrared heating. Significantly shorter time periods can be utilized when heating by other methods such as inductive heating, such as from about 10 seconds to 10 minutes and preferably from about 30 seconds to 5 minutes.

Figure 1:
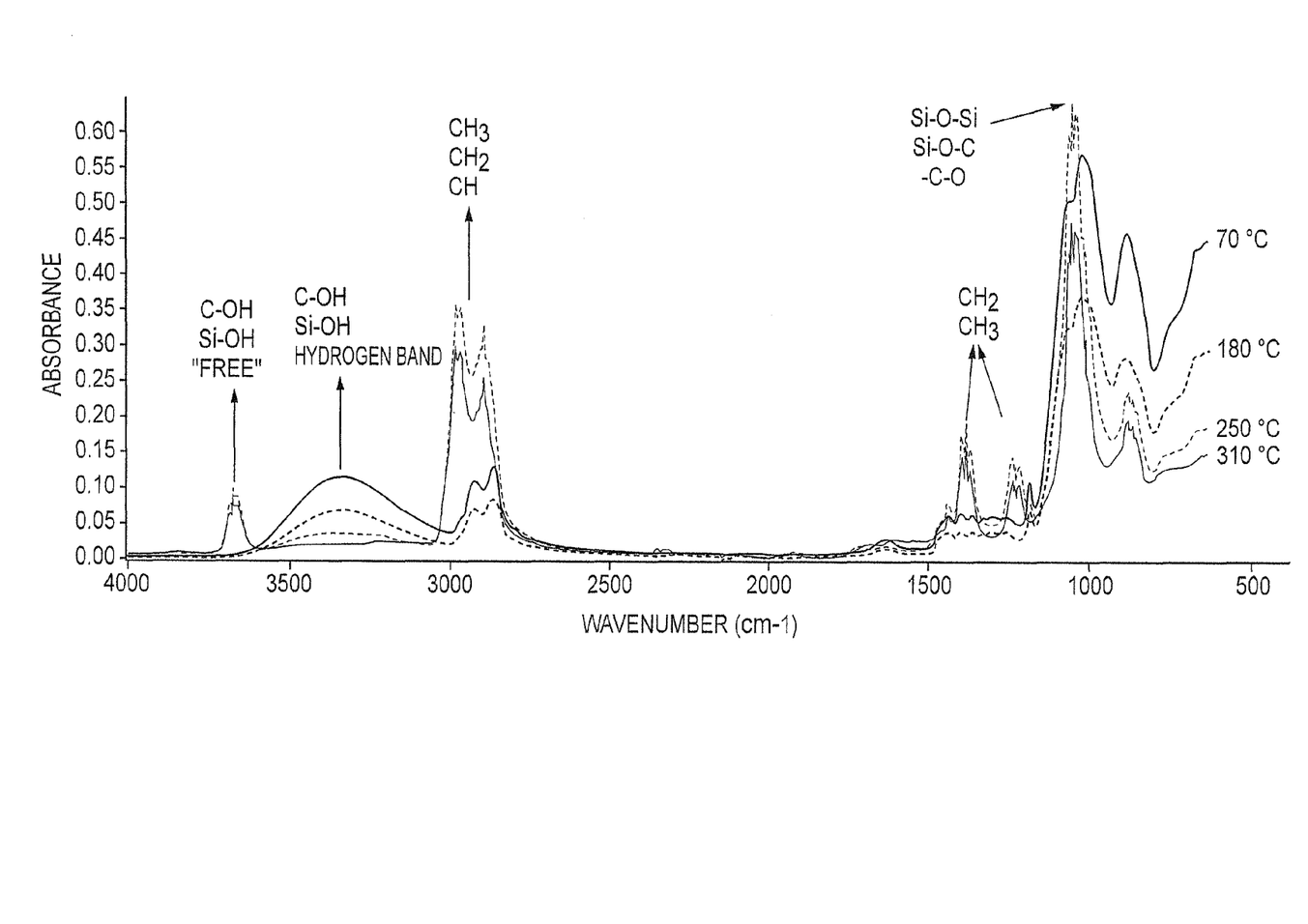
FIG. 1 is a graph of infrared (IR) spectra of several preferred embodiment compositions heated and cured at different temperatures.

Referring to FIG. 1, the infrared (IR) spectra was obtained of a preferred embodiment composition comprising a silane-based binder and heated at different temperatures: 70° C., 180° C., 250° C. and 310° C. From the IR spectra, it can be seen that the films heated at 70° C. and 180° C. show peaks in common, and the resulting films heated at 250° C. and 310° C. show peaks in common. This suggests that the structure of the films heated at 70° C. and 180° C. are likely not significantly different from one another. This also suggests that the structure of the films heated at 250° C. and 310° C. are likely not significantly different from one another. However, the spectra of the films heated at 70° C. and 180° C. as compared to those heated at 250° C. and 310° C. are significantly different as shown in FIG. 1. This suggests that the structure of the films baked and/or cured at these temperatures are very different from one another. This demonstrates that the heating temperature has a significant influence on the structure of the resulting coating layer or film. In addition, utilizing a baking or curing temperature above 180° C. will also improve a coating comprising aluminium or zinc flakes used in the composition of the invention. A high curing temperature such as above 180° C., and preferably above 240° C., is needed to obtain coatings that exhibit significant anticorrosion properties.

The preferred embodiment compositions are baked or cured to form anticorrosion coatings. Specifically, by baking the preferred embodiment compositions at a temperature of at least above 180° C. and below 350° C., an organo-mineral tridimensional structure in the coating and bonding to the substrate are formed. This structure and bonding to the substrate are major factors which enable the resulting coating to serve as an anticorrosion coating. The preferred embodiment coating compositions when baked at temperatures within a range of greater than 180° C. and up to 350° C. exhibit a resistance to saline mist such that the coatings can withstand exposure to saline mist for at least 200 hours and preferably at least 250 hours, without formation and appearance of red rust. These characteristics are with regard to standard application conditions and measured in accordance with the standard salt projection test, ISO 9227.

Generally, a coating containing metal particles in an inorganic binder such as silane which is not baked at a temperature at least above 180° C. and below 350° C., does not confer anticorrosion properties. Such a coating will not exhibit a resistance to saline mist higher than 200 to 250 hours without red rust, in standard application conditions and measured by means of the standard salt projection test ISO 9227, which is clearly not sufficient for anticorrosion coatings.

Although not wishing to be bound to any particular theory, it is believed that the lack of such resistance to saline mist is due to the lack of formation of a three-dimensional structure of the coating and/or bonding to the substrate which occurs if the coating composition is not baked to an appropriate temperature, which is at least above 180° C.

Many other benefits will no doubt become apparent from future application and development of this technology.

All patents, published applications, industry standards and articles noted herein are hereby incorporated by reference in their entirety.

It will be understood that any one or more feature or component of one embodiment described herein can be combined with one or more other features or components of another embodiment. Thus, the present invention includes any and all combinations of components or features of the embodiments described herein.

As described hereinabove, the present invention solves many problems associated with previously known compositions and practices. However, it will be appreciated that various changes in the details, materials and arrangements of components and operations, which have been herein described and illustrated in order to explain the nature of the invention, may be made by those skilled in the art without departing from the principle and scope of the invention, as expressed in the appended claims.

What is claimed is:

1. An anticorrosion coating for metallic substrate, the coating resulting from baking a coating composition at a temperature between greater than 180° C. and up to 350° C., the coating composition including from 0.3% to 24% by weight of at least one of an organic titanate and/or an organic zirconate, from 10% to 40% by weight of a particulate metal or a mixture of particulate metals, at least 1% by weight of a silane-based binder, and water, wherein the sum of the organic titanate and/or zirconate and of the silane-based binder is from 5 to 25% by weight, wherein upon baking, the coated metallic substrate exhibits resistance to corrosion from exposure to saline mist for at least 200 hours without formation of red rust and wherein the anticorrosion coating has a thickness of the dry film between 3 μm (11 g/m$^2$) and 30 μm (110 g/m$^2$).

2. The anticorrosion coating of claim 1 wherein (i) the organic titanate is selected from the group consisting of titanates compatible in organic phase, titanates compatible in aqueous phase, and combinations thereof, and (ii) the organic zirconate is selected from the group consisting of zirconates compatible in organic phase, zirconates compatible in aqueous phase, and combinations thereof.

3. The anticorrosion coating of claim 2 wherein the titanates compatible in organic phase are $C_1$-$C_8$ tetraalkyl titanates and the zirconates compatible in organic phase are $C_1$-$C_8$ tetraalkyl zirconates.

4. The anticorrosion coating of claim 3 wherein the $C_1$-$C_8$ tetraalkyl titanates are selected from the group consisting of tetraethyl titanate, tetra-n-butyl titanate, octylene glycol titanate and combinations thereof, and the $C_1$-$C_8$ tetraalkyl zirconates are selected from the group consisting of tetra-n-propyl zirconate, tetra-n-butyl zirconate, and combinations thereof.

5. The anticorrosion coating of claim 2 wherein the titanates compatible in aqueous phase are chelated organic titanates, and the zirconates compatible in aqueous phase are chelated organic zirconates.

6. The anticorrosion coating of claim 5 wherein the chelated organic titanates are triethanolamine titanates or chelate of titanate and lactic acid and the chelated organic zirconates are triethanolamine zirconates or chelate of zirconate and lactic acid.

7. The anticorrosion coating of claim 1 wherein the particulate metal is selected from the group consisting of zinc, aluminium, zinc alloys, aluminium alloys, and combinations thereof.

8. The anticorrosion coating of claim 7 wherein the alloys include metals selected from the group consisting of aluminium, manganese, magnesium, tin, and combinations thereof.

9. The anticorrosion coating of claim 7 wherein the alloys include a eutectic alloy of zinc and aluminium and a trace of rare earth elements.

10. The anticorrosion coating of claim 1 wherein the silane-based binder comprises a silane having at least one hydrolysable hydroxyl function.

11. The anticorrosion coating of claim 10 wherein the hydrolysable hydroxyl function is a $C_1$-$C_8$ alkoxy radical.

12. The anticorrosion coating of claim 1 wherein the silane includes an epoxy function.

13. The anticorrosion coating of claim 1 wherein the silane is selected from the group consisting of di- or trimethoxysilane with an epoxy function, di- or triethoxysilane with an epoxy function, and mixtures thereof.

14. The anticorrosion coating of claim 13 wherein the trimethoxysilane is selected from the group consisting of gamma-glycidoxypropyltrimethoxysilane,beta-(3,4-epoxycyclohexyl)ethyltrimethoxysilane, and mixtures thereof.

15. The anticorrosion coating of claim 1 wherein the coating composition further includes an organic solvent or a mixture of organic solvents.

16. The anticorrosion coating of claim 15 wherein the organic solvent is selected from the group consisting of glycolic solvents, acetates, nitroalcane, alcohols, ketones, white spirit, 2,2,4-trimethyl-1,3-pentanediol isobutyrate (texanol), and mixtures thereof.

17. The anticorrosion coating composition of claim 1 wherein the coating composition further includes from 0.1 to 7% by weight of molybdenum oxide, with respect to the total weight of the composition.

18. The anticorrosion coating composition of claim 1 wherein the coating composition further includes from 0.5 to 10% by weight, with respect to the total weight of the composition, of an anticorrosion reinforcing agent selected from the group consisting of yttrium, zirconium, lanthanum, cerium, praseodymium, in the form of oxides or of salts thereof.

19. The anticorrosion coating composition of claim 1 wherein the coating composition further includes from 0.2 to 4% by weight, with respect to the total weight of the composition, of a corrosion inhibitor pigment.

20. The anticorrosion coating composition of claim 19 wherein the corrosion inhibitor pigment is aluminium tripolyphosphate.

21. The anticorrosion coating composition of claim 1 wherein the coating composition further comprises an agent selected from the group consisting of a thickening agent, a wetting agent, and combinations thereof.

22. The anticorrosion coating composition of claim 21 wherein the thickening agent is present in an amount of 0.005 to 7% by weight with respect to the total weight of the coating composition.

23. The anticorrosion coating composition of claim 21 wherein the wetting agent is present in an amount of 0.1 to 4% by weight with respect to the total weight of the coating composition.

24. The anticorrosion coating of claim 1 wherein the coating exhibits exposure to saline mist for at least 250 hours without formation of red rust.

25. The anticorrosion coating composition of claim 1 wherein the baking operation (i) is performed for 10 to 60 minutes by convection or infrared or (ii) is performed for 30 seconds to 5 minutes by induction.

26. The anticorrosion coating composition of claim 1 wherein prior to the baking operation the coated layer is subjected to a drying operation by supplying thermal energy.

27. The anticorrosion coating composition of claim 26 wherein the drying operation by supplying thermal energy includes at least one of convection, infrared, and induction.

28. The anticorrosion coating composition of claim 27 wherein the drying operation is performed at a temperature of between 30 and 250° C.

29. The anticorrosion coating composition of claim 28 wherein the drying operation (i) is performed by convection or infrared for 10 to 30 minutes on line or (ii) is performed for 30 seconds to 5 minutes by induction.

30. The anticorrosion coating composition of claim 1 wherein the thickness is between 4 µm (15 g/m$^2$) and 12 µm (45 g/m$^2$).

31. The anticorrosion coating composition of claim 30 wherein the thickness is between 5 µm (18 g/m$^2$) and 10 µm (40 g/m$^2$).

32. A coated metallic substrate comprising:
a metallic substrate selected from the group consisting of steel, zinc-coated steel, steel covered with a zinc-based coating, cast iron and aluminum;
a coating disposed on the metallic substrate, the coating resulting from baking a coating composition at a temperature between greater than 180° C. and up to 350° C., the coating composition including from 0.3% to 24% by weight of at least one of an organic titanate and/or an organic zirconate, from 10% to 40% by weight of a particulate metal or a mixture of particulate metals, at least 1% by weight of a silane-based binder, and water, wherein the sum of the organic titanate and/or zirconate and of the silane-based binder is from 5 to 25% by weight, wherein upon baking, the coated metallic substrate exhibits resistance to corrosion from exposure to saline mist for at least 200 hours without formation of red rust and wherein the anticorrosion coating has a thickness of the dry film between 3 µm (11 g/m$^2$) and 30 µm (110 g/m$^2$).

33. The coated metallic substrate of claim 32 wherein the metallic substrate is steel covered with a zinc-based coating.

* * * * *